Dec. 19, 1922.
L. HOTTO.
SHOCK ABSORBING SPRING SUSPENSION DEVICE.
FILED JUNE 8, 1921.
1,439,626.
2 SHEETS—SHEET 1.
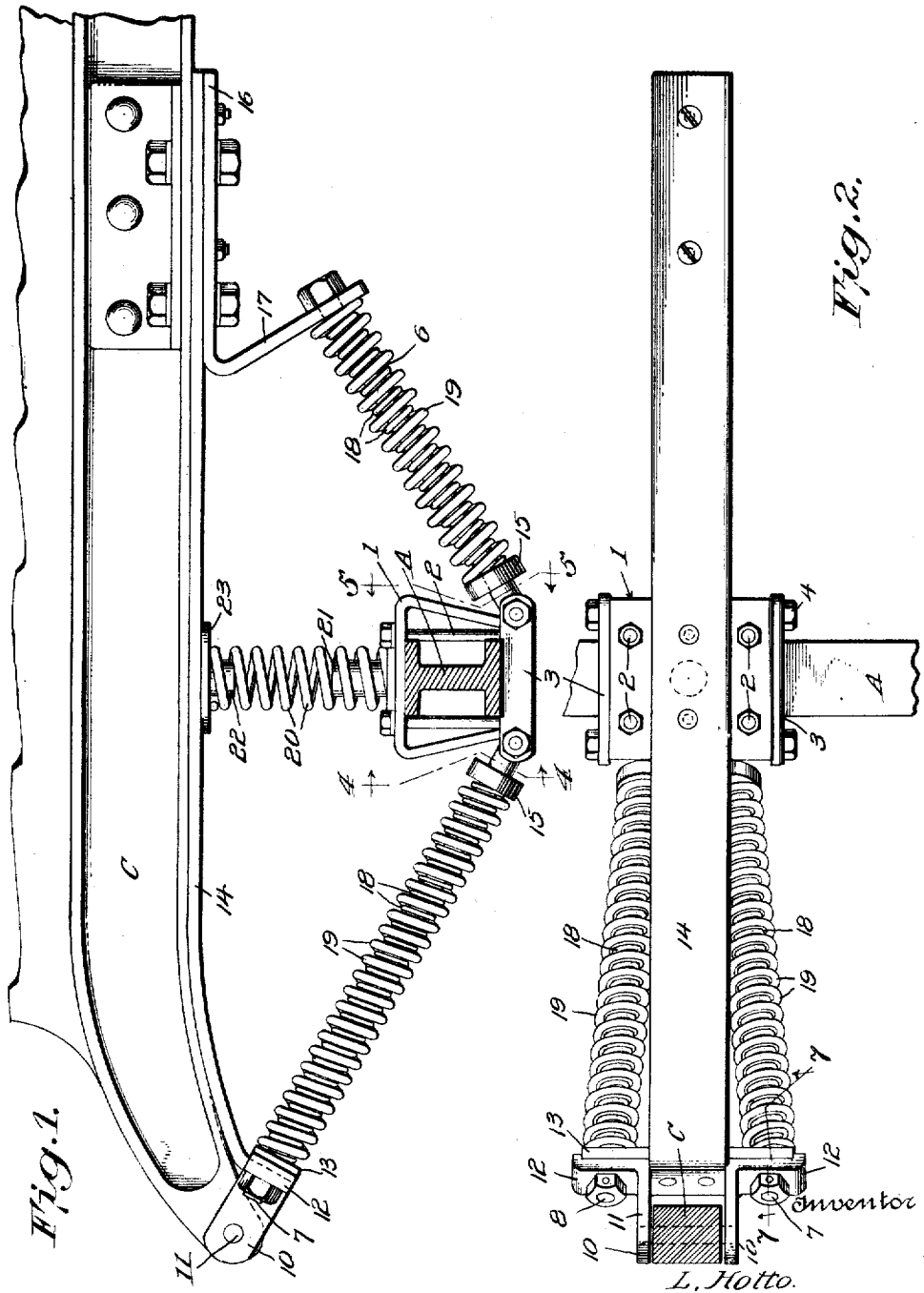

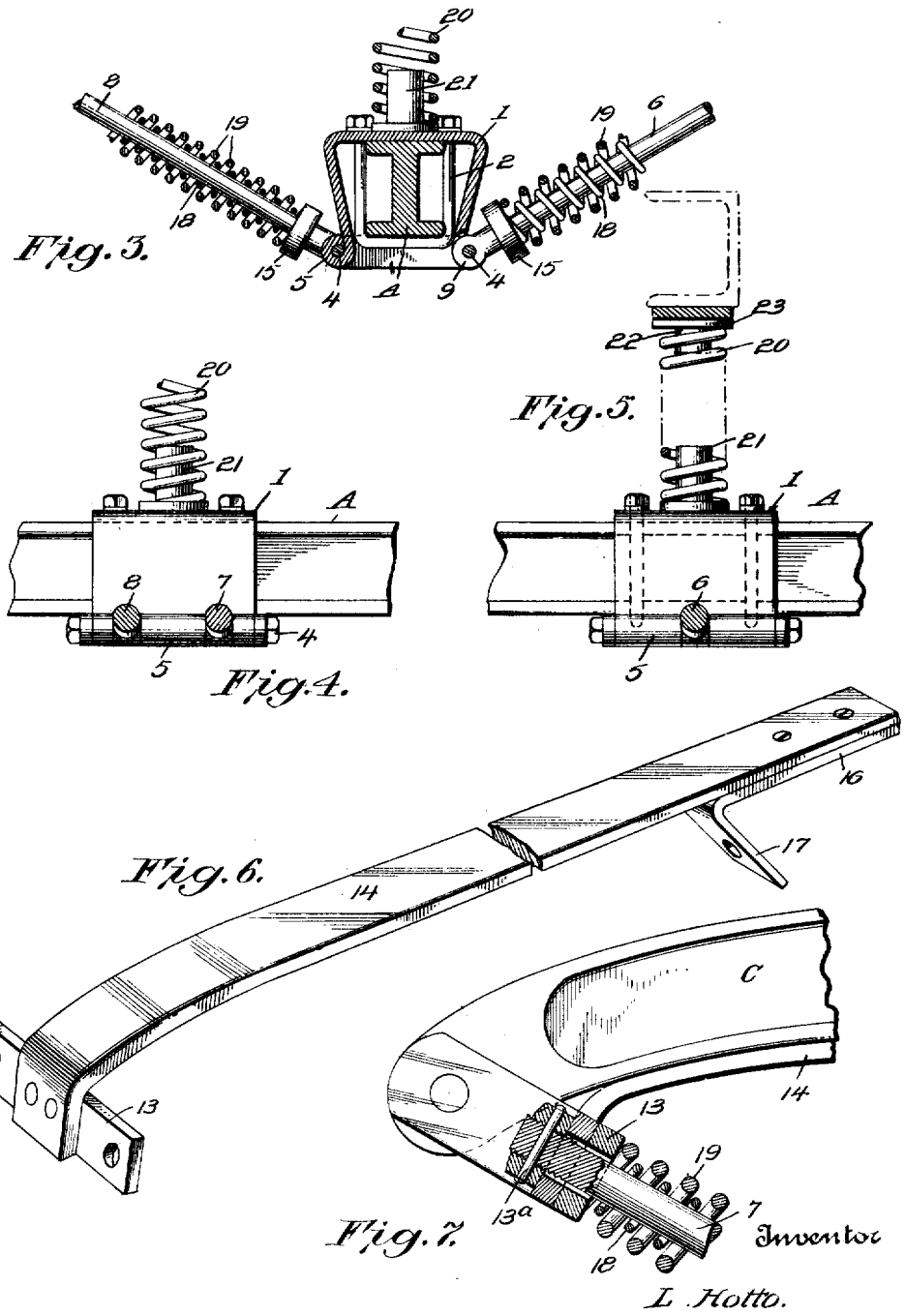

Patented Dec. 19, 1922.

1,439,626

UNITED STATES PATENT OFFICE.

LOUIS HOTTO, OF PRAIRIE DU PONT, ILLINOIS.

SHOCK-ABSORBING SPRING-SUSPENSION DEVICE.

Application filed June 6, 1921. Serial No. 475,981.

*To all whom it may concern:*

Be it known that I, LOUIS HOTTO, a citizen of the United States, residing at Prairie du Pont, in the county of St. Clair and State of Illinois, R. F. D. 1, have invented certain new and useful Improvements in Shock-Absorbing Spring-Suspension Devices, of which the following is a specification.

This invention relates to a combined shock absorbing spring suspension device.

The main object of the invention is to provide a shock absorbing suspension device so connecting a supported and supporting member that the jars and jolts received by the latter will not be transmitted to the former and which is especially designed for use in supporting a vehicle body against shocks.

Another object of the invention is to provide a device of this character which is simple, cheap, and durable in construction and which may be readily applied to a vehicle and when so applied will absorb the jars and bumps so that the occupants of the vehicle will not be annoyed thereby.

With these and other objects in view, the invention consists in certain novel features of construction as hereinafter shown, described and claimed.

In the accompanying drawings:

Figure 1 represents a side elevation of a portion of a vehicle chassis with this improved device shown applied, part of the chassis being broken away and the axle of the vehicle shown in transverse section.

Fig. 2 is a plan view thereof, the chassis being shown in section.

Fig. 3 is a detail transverse section with parts broken out.

Fig. 4 is a transverse section taken on the line 4—4 of Fig. 1.

Fig. 5 is a similar view taken on the line 5—5 of Fig. 1.

Fig. 6 is a detail perspective view of one member of the device with parts broken out for convenience in illustration, and:

Fig. 7 is a detail sectional view taken on the line 7—7 of Fig. 2 with the chassis shown in elevation and partly broken out.

In the embodiment illustrated the member to be supported is shown in the form of a vehicle chassis C and the supporting member or members constitute the two axles, one only of which is shown at A.

The means for securing the device to the axle A comprises a housing 1 inverted U-shaped in cross section which fits over the top of the axle A here shown in the form of an I-beam and secured in position by means of U-bolts 2 which extend under the axle A and up through the housing 1 as is shown clearly in Fig. 3 being equipped with the usual nuts for holding them in operating engagement. Plates or bars 3 extend across the ends of the housing 1 below the axle A and are secured to said housing by means of bolts which extend through the ends of the plates 3 and through bearings 5 formed at the lower ends of the housing by rolling said housing outwardly. These bolts also connect to the housing 1 a plurality of spring carrying rods 6, 7, and 8, the lower ends of which have bearing 9 for the passage therethrough of the connecting bolts 4.

The rod 6 extends centrally from the inner side of the housing 1 to a point presently to be described, while the rods 7 and 8 are spaced laterally apart on the opposite side of the housing and located in planes outside the plane occupied by the rod 6 and extend upwardly and outwardly and are connected with the outer end of the chassis C as shown in Fig. 1 by means of clamps or clips 10, two of which are shown, one arranged on each side of the side bar of the chassis C. These brackets or clamps 10 are shown L-shaped in form with the long arms thereof straddling the chassis and bolted thereto, said connecting bolt operating as spindles 11 for (see Fig. 1), the short arms 12 on the L-shaped brackets 10 project laterally outward from the opposed sides of the chassis C and overlie the apertured ends of a cross bar or plate 13 which is carried by the outer end of a strip or plate 14. The ends of this plate or bar 13 project on opposite sides of the plate 14 and rods 7 and 8 pass through the apertures therein and through corresponding apertures in the arms 12 of the brackets 10 and are secured by nuts which are locked thereon by any suitable means, pins 13ᵃ being here shown passed through said nuts and through the outer ends of the rods (see Fig. 7).

The plate 14 is arranged longitudinally under the side bar of the chassis shown in Fig. 1 and is secured at its outer end to the brackets 10 in the manner above described while its inner end is bolted to one flange of the channel iron chassis as shown in Fig. 1.

A strap 16 is carried by the inner end of the plate 14 on the lower face thereof and has a depending downwardly and forwardly inclined arm 17 which is apertured to receive the inner upper end of the rod 6, which rod is secured to said bracket arm by a nut locked thereto by any suitable means.

Mounted on each of the rods 6, 7, and 8 are inner and outer coiled springs 18 and 19 respectively. The outer spring 19 is heavier than the inner spring 18 and which bear at their inner ends against collars 15 carried by said rods and at their outer ends against the bracket arms 17 and 13 respectively. These coiled springs yieldingly oppose any relative downward movement of the ends of the plate 14.

A heavy coiled spring 20 is mounted on the upper face of the housing 1 between it and the plate 14 being engaged at its opposite ends with studs 21 and 22 carried respectively by said housing 1 and plate 14, the stud 22 being secured to and forming a part of a plate 23 carried by the lower face of the plate 14 and operates to prevent any vertical upward movement of the axle A from being transmitted to the vehicle body.

From the above description, it will be obvious, that the plates 14 are used to attach the devices to the chassis C, and the ends of rods 6, 7, and 8 slide upward against the tension of the coiled springs 18 and 19 carried by said bars and this spring action in connection with the spring 20 operates to effectively cushion the vehicle body or other supported element and to absorb all shocks, which are received by the axle A and prevent the transmission thereof to said vehicle body or supported elements.

While the device is herein shown and described as applied to a vehicle obviously it may be employed as a shock absorbing spring suspension device in many places for connecting a supported member and supporting member therefor so that jars and jolts applied to the supporting member will have very little if any effect in causing up and down movement of the supported member.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:—

1. A shock absorbing spring suspension mechanism comprising a bar adapted to be secured to a member to be supported and having one end provided on opposite sides thereof with laterally extending apertured arms and further having its other end provided with a depending obliquely disposed apertured arm, a housing adapted to be secured to an underlying supporting member, a coiled spring interposed between said bar and housing, a pair of rods pivotally connected at one end to the lower end of said housing and each slidably mounted at its outer end in a lateral arm, an inclined rod pivotally connected at its inner end to said housing and slidably mounted at its outer end in said obliquely disposed apertured arm, securing means on the outer ends of said arms, an inner and outer coiled spring mounted on each of said rods between said arms and the pivoted lower ends of the rod.

2. A shock absorbing spring suspension mechanism comprising a bar adapted to be secured to a member to be supported and having one end provided on opposite sides thereof with laterally extending apertured arms and further having its other end provided with a depending obliquely disposed apertured arm, a housing adapted to be secured to an underlying supporting member, a coiled spring interposed between said bar and housing, a pair of rods pivotally connected at one end to the lower end of said housing and each slidably mounted at its outer ends in a lateral arm, an inclined rod pivotally connected at its inner end to said housing and slidably mounted at its outer end in said obliquely disposed apertured arm, securing means on the outer ends of said arms, an inner and outer coiled spring mounted on each of said rods between said arms and the pivoted lower ends of the rod, guiding studs carried by the upper face of the housing and the lower face of said bar and cooperating with that spring interposed between the bar and the housing.

3. A shock absorbing spring suspension mechanism comprising a bar adapted to be secured to a member to be supported and having one end provided on opposite sides thereof with laterally extending apertured arms and further having its other end provided with a depending obliquely disposed apertured arm, a housing adapted to be secured to an underlying supporting member, a coiled spring interposed between said bar and housing, a pair of rods pivotally connected at one end to the lower end of said housing and each slidably mounted at its outer ends in a lateral arm, an inclined rod pivotally connected at its inner end to said housing and slidably mounted at its outer end in said obliquely disposed apertured arm, securing means on the outer ends of said arms, an inner and outer coiled spring mounted on each of said rods between said arms and the pivoted lower ends of the rod, and said bar having that end provided with a lateral arm depending and extending at an outward inclination.

In testimony whereof, I affix my signature.

LOUIS HOTTO.